(12) United States Patent
Hartvigsen

(10) Patent No.: US 9,157,689 B2
(45) Date of Patent: Oct. 13, 2015

(54) FIXED BED REACTOR HEAT TRANSFER STRUCTURE

(71) Applicant: Ceramatec, Inc., Salt Lake City, UT (US)

(72) Inventor: Joseph J. Hartvigsen, Kaysville, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 134 days.

(21) Appl. No.: 14/078,040

(22) Filed: Nov. 12, 2013

(65) Prior Publication Data

US 2014/0134067 A1 May 15, 2014

Related U.S. Application Data

(60) Provisional application No. 61/725,385, filed on Nov. 12, 2012.

(51) Int. Cl.
*F28F 7/00* (2006.01)
*B01J 8/00* (2006.01)
*B01J 8/02* (2006.01)
*B01J 19/00* (2006.01)
*B01J 19/24* (2006.01)

(52) U.S. Cl.
CPC ........................................ *F28F 7/00* (2013.01)

(58) Field of Classification Search
CPC ........... F28F 7/00; F28F 2215/00; B01J 8/00; B01J 8/02; B01J 19/00; B01J 19/24; B01J 2219/00; B01J 2219/00049–2219/00063; B01J 2219/00074–2219/00085; B01J 2219/00159
See application file for complete search history.

(56) References Cited

U.S. PATENT DOCUMENTS

| 2,895,508 A | * | 7/1959 | Drake | 138/38 |
| 4,479,359 A | * | 10/1984 | Pelloux-Gervais | 62/50.2 |
| 2007/0299148 A1 | * | 12/2007 | Verbist | 518/712 |

FOREIGN PATENT DOCUMENTS

WO  WO 2012/131385 A2 * 10/2012

OTHER PUBLICATIONS

Lee, Chang H., "International Search Report", PCT Application No. PCT/US2013/069694 (Corresponding to U.S. Appl. No. 14/078,040), (Feb. 17, 2014),1-3.
Lee, Chango H., "Written Opinion of the International Searching Authority", PCT Application No. PCT/US2013/69694 (Corresponding to U.S. Appl. No. 14/078,040), (Feb. 17, 2014),1-10.

* cited by examiner

Primary Examiner — Natasha Young
(74) Attorney, Agent, or Firm — David Fonda

(57) ABSTRACT

An apparatus includes a heat transfer structure configured to be disposed at least partially within an enclosure of a fixed bed reactor and operable to transfer heat from a heat source to a heat sink. The heat transfer structure includes a plurality of fins each fin including a first end and a second end, the first end contacting an inner surface of the enclosure of the fixed bed reactor, the second end at least partially enclosed within the enclosure of the fixed bed reactor. A path of at least one of the plurality of fins comprises the shortest possible length between the first end of the at least one of the plurality of fins and the second end of the at least one of the plurality of fins.

21 Claims, 8 Drawing Sheets

FIXED BED REACTOR HEAT TRANSFER STRUCTURE

CROSS-REFERENCE TO RELATED APPLICATIONS

This application claims the benefit of U.S. Provisional Application No. 61/725,385, filed on Nov. 12, 2012, which is incorporated by reference herein in its entirety.

TECHNICAL FIELD

The present disclosure relates to heat transfer structures within fixed bed reactors. In particular, the present disclosure relates to heat transfer structures used during exothermic and endothermic reactions to more efficiently control temperature within fixed bed reactors during the exothermic and endothermic reactions.

BACKGROUND

A Fischer Tropsch ("FT") process, which is sometimes called FT synthesis is a chemical reaction used for the production of various hydrocarbons from the input of synthesis gas, sometimes referred to as syngas. It is a surface catalyzed carbon polymerization process that largely produces straight chain hydrocarbons that range from C1 to greater than C100 hydrocarbons that generally follow a distribution called the Anderson-Schulz-Flory ("ASF") distribution. Maintaining the temperature of the catalyst bed at an even temperature across the diameter and the length of the reactor is important in producing more valuable products. Other highly exothermic reactions call for efficient heat transfer out of a reactor to maintain consistent reactions. In similar fashion, highly endothermic reactions call for efficient heat transfer into a reactor.

SUMMARY

Embodiments of an apparatus are described. In one embodiment, the apparatus includes a heat transfer structure configured to be disposed at least partially within a fixed bed reactor. The heat transfer structure is operable to conduct heat from a heat source to a heat sink. The heat transfer structure includes a plurality of fins each including a first end and a second end, the first end contacting an inner surface of the enclosure of the fixed bed reactor. The second end is at least partially enclosed within the enclosure of the fixed bed reactor. The path of at least one of the plurality of fins includes the shortest possible length between the first end and the second end. Other embodiments of the apparatus are also described.

Embodiments of a method are also described. In one embodiment, the method is a method for conducting heat through a heat transfer structure of a fixed bed reactor. The method includes generating heat in a cavity near the heat transfer structure and conducting heat through the heat transfer structure. The heat transfer structure includes a plurality of fins each including a first end and a second end, the first end contacting an inner surface of the enclosure of the fixed bed reactor, the second end at least partially enclosed within the enclosure of the fixed bed reactor. At least one of the plurality of fins follows a path. The path includes the shortest possible length between the first end and the second end. Other embodiments of the method are also described.

Embodiments of a system are also described. In one embodiment, system includes a fixed bed reactor enclosing a catalytic material. The fixed bed reactor is configured to receive a feed stream, the feed stream reacting with the catalytic material. The system also includes a heat transfer structure configured to be disposed at least partially within an enclosure of the fixed bed reactor and operable to transfer heat from a heat source to a heat sink. The heat transfer structure includes a plurality of fins each including a first end and a second end, the first end contacting an inner surface of the enclosure of the fixed bed reactor, the second end at least partially enclosed within the enclosure of the fixed bed reactor. At least one of the plurality of fins follows a path. The path includes the shortest possible length between the first end and the second end. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
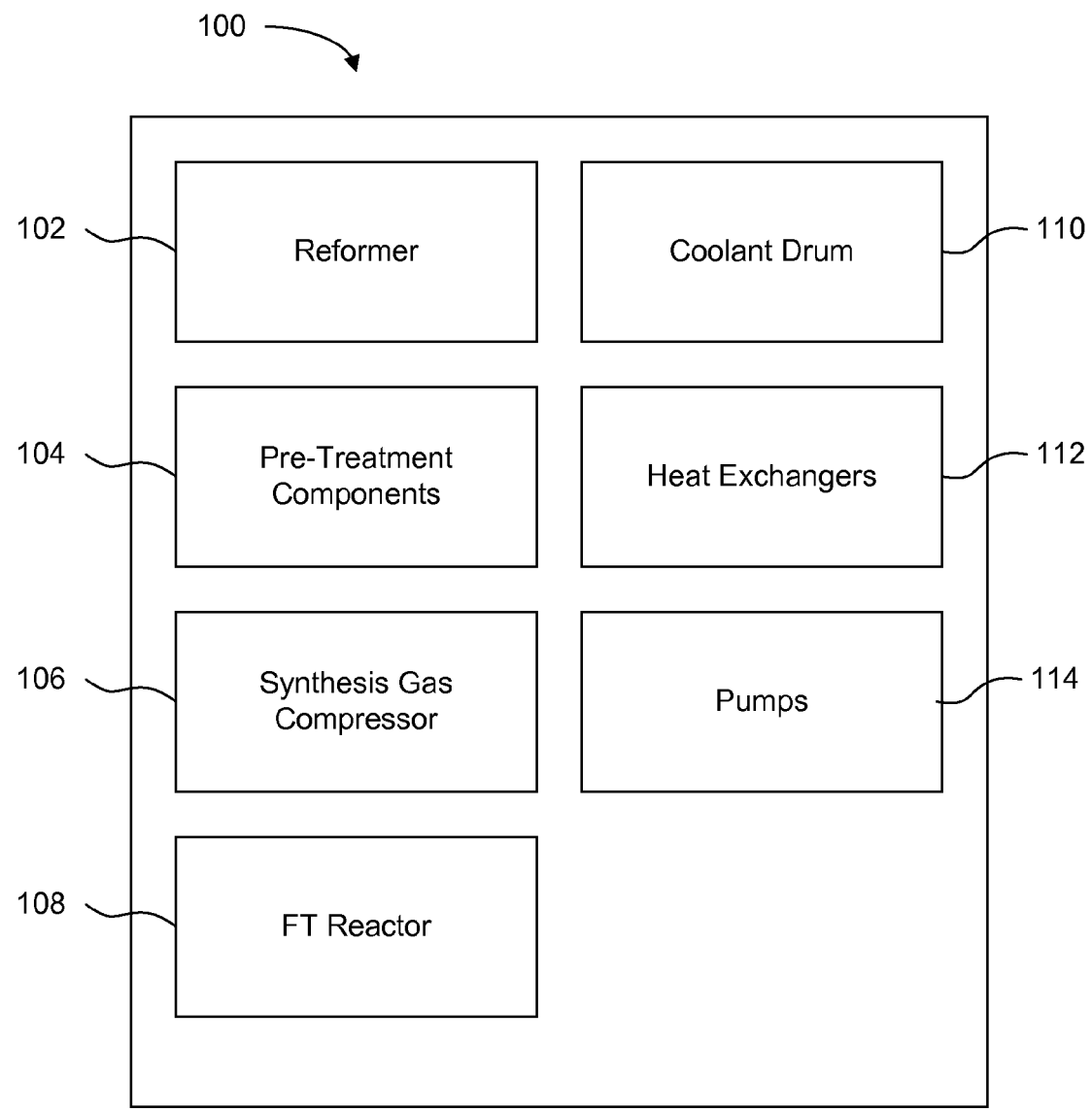
FIG. 1 depicts a schematic diagram of one embodiment of a system for the production of Fischer Tropsch products.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to transferring heat into or out of fixed bed reactors. Generally, the embodiments described below are drawn to efficient temperature control of FT reactors. Some embodiments may be useful to more efficiently transfer heat out of fixed bed reactors. Some embodiments allow use of larger diameter catalyst containing tubes. Some embodiments allow use of fewer reactor tubes by an order of magnitude. Some embodiments reduce manufacturing cost and reduce the mechanical complexity of manifolds. Some embodiments reduce the yield of gaseous hydrocarbons and lower value products. Some embodiments improve the temperature gradient of larger diameter reactor tubes. Some embodiments reduce the number of parts to be manufactured.

In accordance with the teachings of the present disclosure, disadvantages and problems associated with previous FT processes may be reduced or eliminated. In particular, the teachings of the present disclosure relate to apparatus, methods, and systems for controlling heat within an FT system and other highly exothermic reactions. Additionally, the teachings of the present disclosure relate to apparatus, methods, and systems for controlling heat within highly endothermic reactions.

Various advantages may include an increase in the ability to control temperatures in the production system and the input system, which may allow for an increase in the production of economically valuable FT product. Other technical advantages will be readily apparent to one of ordinary skill in the art from the following figures, descriptions, and claims. Moreover, while specific advantages have been enumerated above, various embodiments may include all, some, or none of the enumerated advantages.

FIG. 1 depicts a schematic diagram of one embodiment of a system 100 for the production of Fischer Tropsch products. Although the illustrated system 100 is shown and described with certain components and functionality, other embodiments of the system 100 may include fewer or more components to implement less or more functionality. Although the illustrated system 100 describes a system for the production of FT products, the apparatus, systems, and methods described herein may be applied to other exothermic processes such as methanation, DME, menthanol synthesis, etc. and endothermic processes such as steam methane reforming and de sulfurization etc., including other gas to liquid processes and other synthesis gas to liquid hydrocarbon processes.

The illustrated system 100 includes a reformer 102, pre-treatment components 104, a synthesis gas compressor 106, an FT reactor 108, a coolant drum 110, heat exchangers 112, and pumps 114. Although not depicted, the system 100 may include air compressors, condensers, accumulators, electrical panels, a steam generator, chillers, and a variety of other components to facilitate movement of the various feed, outlet, and/or recycle streams within the system and to facilitate cooling.

System 100 may be used to create FT hydrocarbons from various feed streams. In some embodiments, system 100 includes a reformer 102 for the production of synthesis gas. In one embodiment, system 100 may be used to create FT hydrocarbons from a feed stream of natural gas. FT hydrocarbons may be referred to as FT products or FT fuels. In some embodiments, a feed stream may include methane ($CH_4$), ethane ($C_2H_6$), propane ($C_3H_8$), butane ($C_4H_{10}$), mixtures of the preceding and/or other hydrocarbons or compounds. System 100 may utilize a wet gas or dry gas feed stream. In various embodiments, the feed stream may be from a natural gas deposit located in the field or may be from a generated supply, such as a stream of natural gas generated in a refinery. The natural gas feed stream may be introduced into reformer 102 for reformation.

In system 100, synthesis gas or syngas exits reformer 102, travels through syngas compressor 106, and enters FT reactor 108. In some embodiments, chillers and such may be placed at appropriate locations between the reformer 102 and FT reactor 108 to remove water from the produced syngas stream. FT reactor 108 includes a group of FT reactor tubes. More or less FT reactor tubes may be used depending on desired production volume or input capacity. In some embodiments, syngas containing $N_2$ may be fed into one of more FT reactor tubes each with a heat transfer structure. In various embodiments, FT reactor 108 may have any suitable number of FT reactor tubes and the number of suitable reactor tubes may correspond to the overall desired production capacity.

In some embodiments, some form or forms of pre-treatment may be applied to the feed streams by various pre-treatment components 104. For example, particular feed streams from natural gas deposits may contain various sulfur compounds, such as hydrogen sulfide ($H_2S$). Similarly, certain municipalities may add an odorant, such as mercaptan, which includes sulfur, to natural gas for safety reasons. A feed stream that includes sulfur may be treated to remove or reduce certain sulfur compounds prior to entering a reformer 102 for the production of syngas. More typically, the sulfur will be removed after passing through the reformer 102. At this point the sulfur will largely be in the form of hydrogen sulfide. This gas can be removed by a number of processes such as reaction with zinc oxide, the Claus process, or other common industrial processes. In certain embodiments, a fixed bed reactor may be used to remove the sulfur compounds. For example, a fixed bed reactor with an internal heat transfer structure, described more fully below, may be used. The internal heat transfer structure may assist in temperature control, and in particular embodiments, may allow the temperature within the fixed bed reactor to be increased. In various embodiments, the fixed bed reactor may also be used to reduce or remove a variety of other compounds from the feed stream that may be undesirable for certain applications. For example, halogens (e.g. chlorine, bromine, etc.) may be undesirable. The reduction of sulfur or other compounds may occur by directing a feed stream through a fixed bed reactor, similar to the reactor described more fully below.

In some embodiments, an input stream enters FT reactor 108. As examples, an FT reactor may be implemented as a large pressure vessel enclosing a large number of small tubes containing the FT catalyst (a fixed bed reactor) or a large pressure vessel containing a slurry mixture of catalyst and liquid (a slurry bubble column reactor). While expensive to fabricate, both designs are used because of the need to extract heat from the exothermic FT reaction. Failure to maintain the catalyst at the desired temperature results in much of the product hydrocarbons being formed in the short hydrocarbon chain range. Typically, the small tubes in an FT are less than 1" in diameter. The ability to maintain an even temperature in the catalyst bed of a fixed bed FT reactor is important if the desired products are hydrocarbons in the liquid range. As the radius of the FT fixed bed reactor tubes becomes larger, it becomes difficult to transfer the heat to the wall of the reactor tubes. As heat builds in the reactor tubes, the percentage yield of liquid hydrocarbons decreases and the yield of gaseous hydrocarbons increases. The objective of embodiments is to increase the transfer of heat from the cross sectional area of the reactor tubes and to maintain a bed temperature that will provide high yields in the liquid range. The efficient transfer of heat will also enable the use of larger diameter reactor tubes and thus reduce manufacturing costs associated with the FT reactor. Current fixed bed FT reactors are limited to use of catalyst containing tubes that are about one inch (1") in diameter. Some embodiments allow use of tubes that are four inches (4") or larger in diameter because of the enhanced heat transfer.

At least one embodiment of an insert has been designed to transfer heat from the fixed catalyst bed to the walls of the FT reactor for removal. This insert has undergone limited testing and is showing good performance in maintaining good radial and axial temperature control at the reactor size of 1.5" in diameter. A slightly different version of the design was proposed for the 4" diameter reactor.

Thermo-hydraulic analysis of embodiments enables the use of 4" diameter tubes for the FT reactor, while still maintaining axial and radial temperature gradients at an acceptable level. Some embodiments have the further advantage that they may be extruded as one piece and provides enhanced external heat transfer from the reactor tube to the cooling fluid surrounding the tube on the outside. In some embodiments, the whole reactor tube, described more fully below, could be placed inside another tube that would form the pressure boundary for the reactor. The external tube would be further cooled by fluid on its external side In some embodiments, system 100 includes a coolant drum 110, heat exchangers 112, and pumps 114. During production of FT hydrocarbons, system 100 may cycle coolant from coolant drum 110 through FT reactor 108 and around the FT reactor tubes. Heat exchangers 112 facilitate cooling and pumps 114 facilitate movement of various streams within the system 100.

In some embodiments, the FT reactor 108 includes a fixed bed reactor that encloses an FT catalytic material and that is operable to receive a synthesis gas, the synthesis gas reacting on the catalyst material to produce an FT product. In some embodiments, the FT reactor 108 also includes a heat transfer structure configured to be disposed at least partially within the fixed bed reactor, the heat transfer structure forms a plurality of radial components that are configured such that each of the plurality of radial components comes into contact with an inner surface of the fixed bed reactor, wherein the plurality of radial components are at least partially enclosed within the fixed bed reactor, and a first radial component of the plurality of radial components has a different length or cross sectional area than a second radial component of the plurality of radial components, and a cooling structure at least partially surrounding the fixed reactor bed and that is operable to conduct heat away from the heat transfer structure of the fixed bed reactor.

Figure 2:
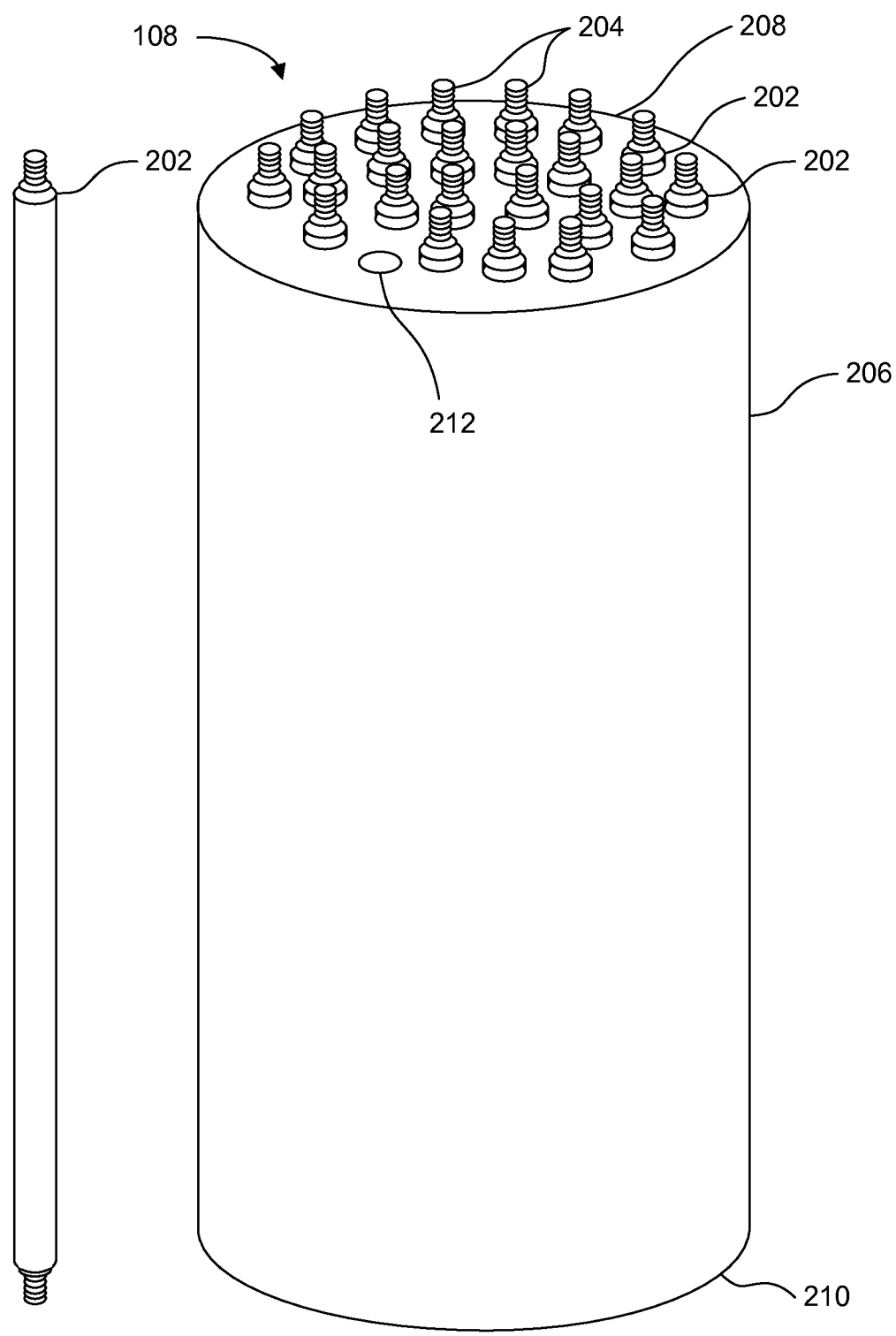
FIG. 2 depicts one embodiment of the Fischer Tropsch ("FT") reactor of FIG. 1.

FIG. 2 depicts one embodiment of the FT reactor 108 of FIG. 1 for the production of Fischer Tropsch products. The depicted embodiment illustrates a perspective view of a FT reactor 108 that includes a group of FT reactor tubes 202. Each FT reactor tube 202 has a cap 204 which allows the reactor tube 202 to receive pressurized synthetic gas. The FT reactor tubes 202 are enclosed within an outer shell 206 and run from a first end 208 to a second end 210 of the FT reactor. A single FT reactor tube 202 is shown outside the outer shell 206 with the hole 212 shown on the first end 208. Inlets and outlets (not shown) allow coolant to enter and exit the FT reactor 108. Each FT reactor tube 202 includes a heat transfer structure operable to conduct heat out of each reactor tube 202. Embodiments of the heat transfer structure are discussed more fully below in connection with the remaining figures.

Figure 3:
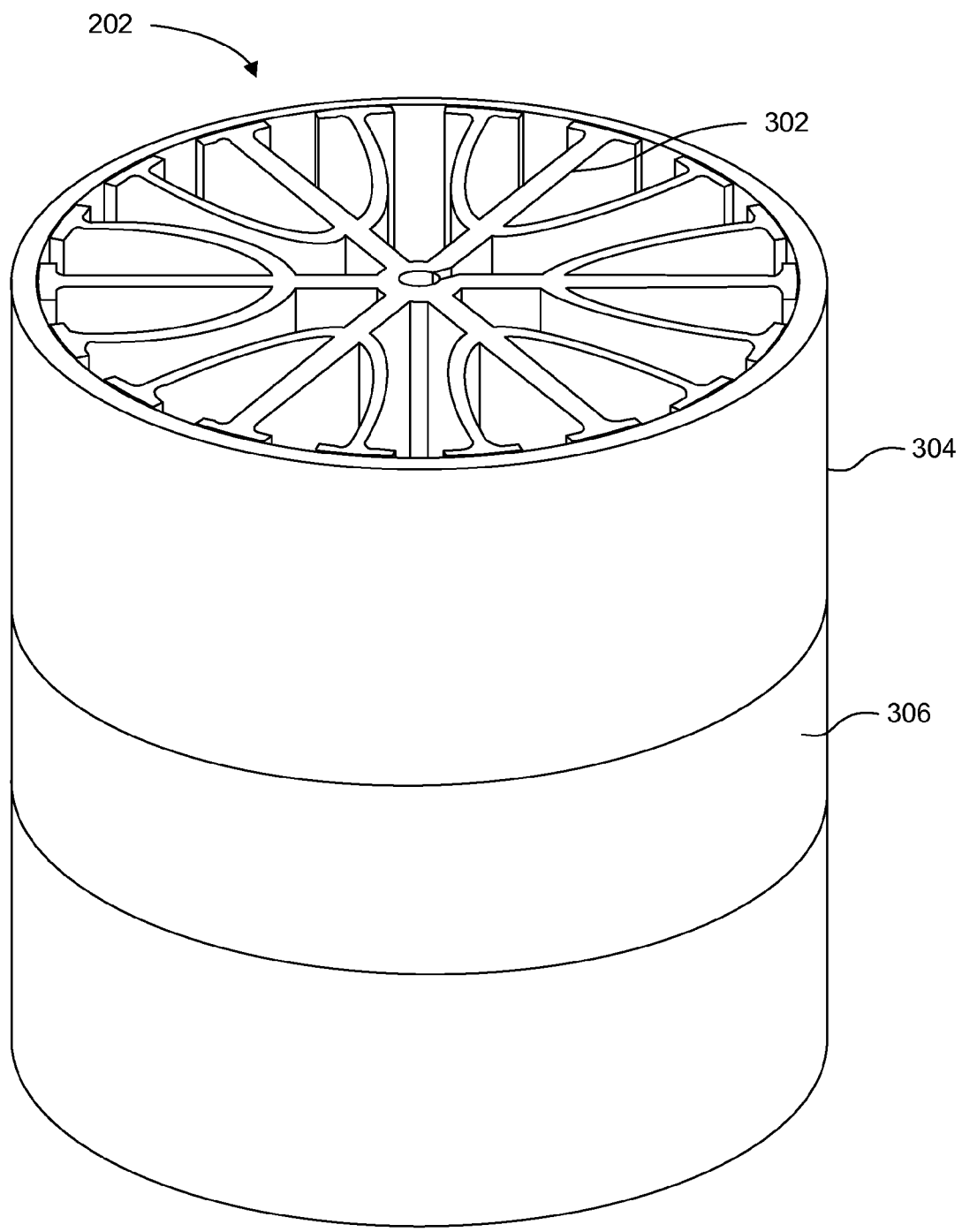
FIG. 3 depicts a cut-away of one FT reactor tube illustrating a heat transfer structure.
Figure 4:
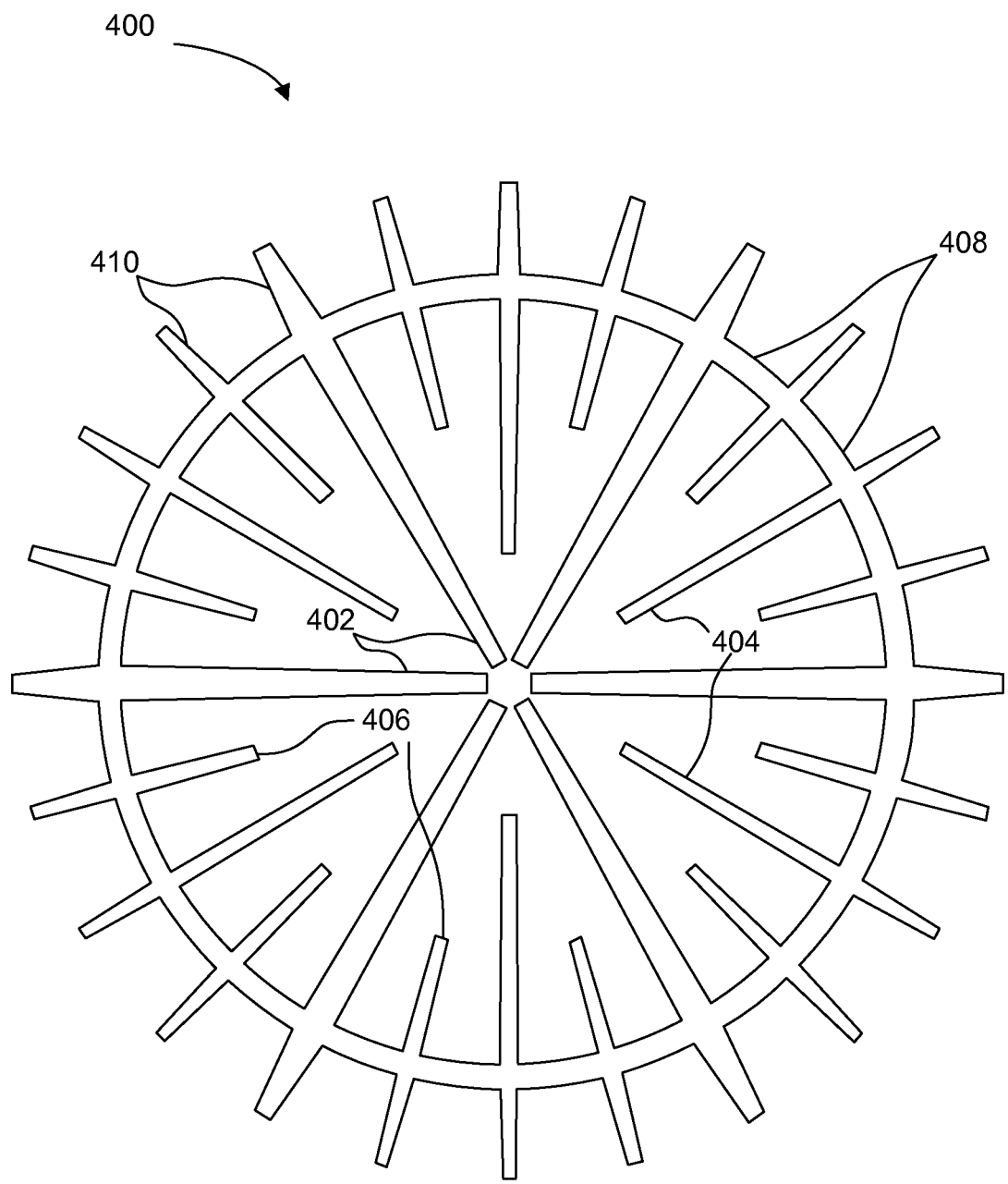
FIG. 4 depicts a cross section of one embodiment of a heat transfer structure with radial components extending within the FT reactor tube.
Figure 5:
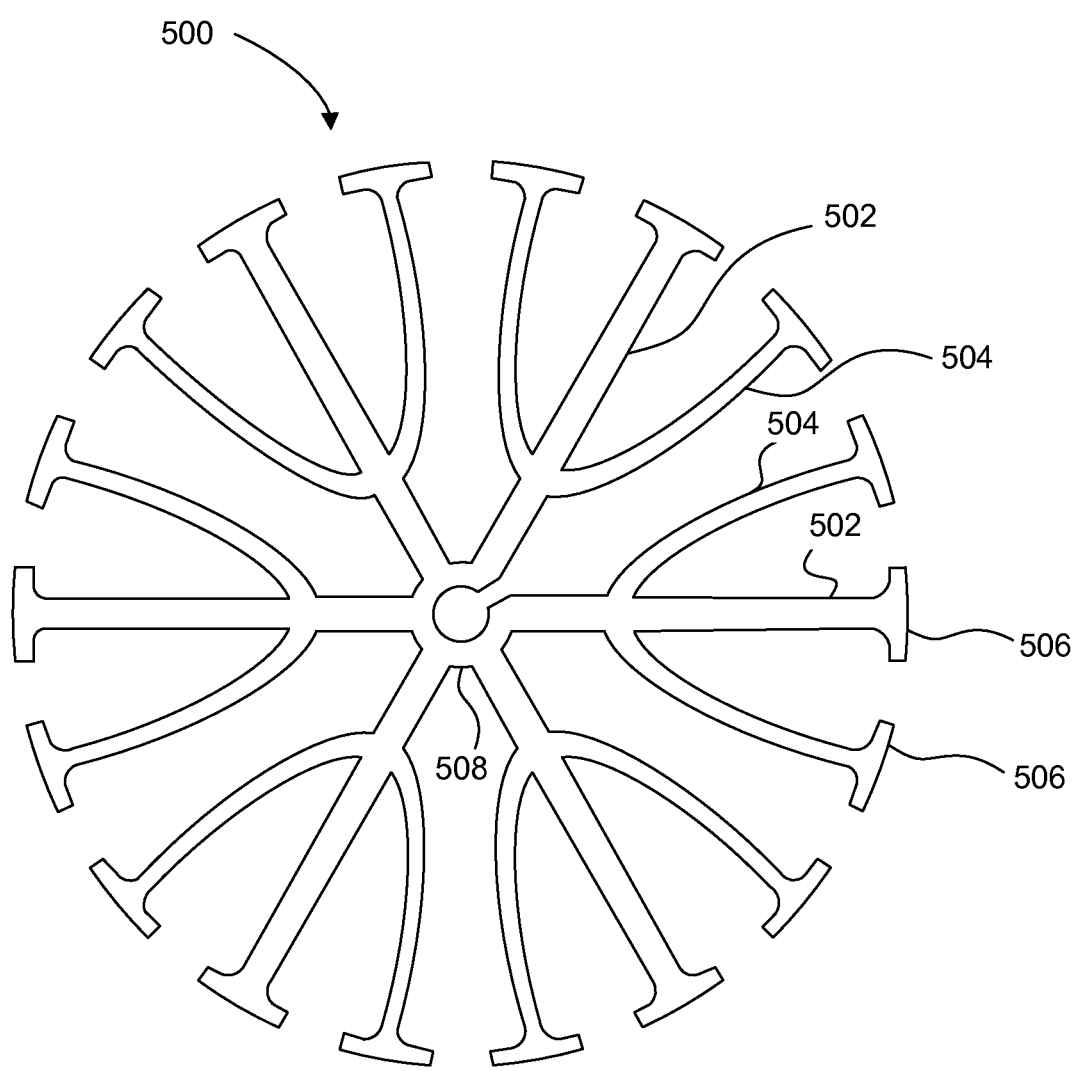
FIG. 5 depicts a cross section of another embodiment of a heat transfer structure with parabolic components.
Figure 6:
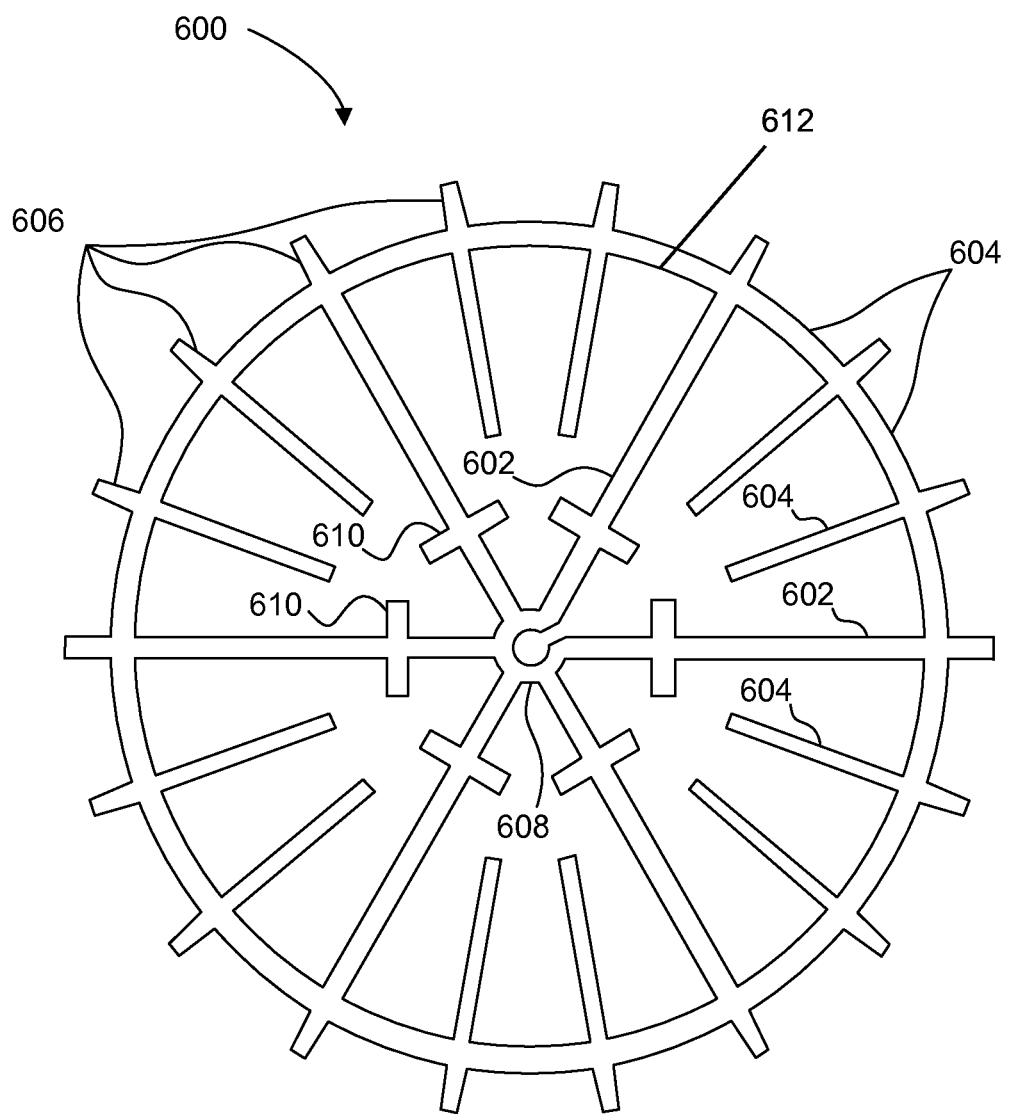
FIG. 6 depicts a cross section of another embodiment of a heat transfer structure.

FIG. 3 depicts a cut-away of one FT reactor tube 202 illustrating a heat transfer structure 302 within the enclosure. In the illustrated embodiment, the heat transfer structure 302 is a structure inserted within an enclosure or tube 304. The heat transfer structure 302 transfers heat from within the enclosure 304 outward. In some embodiments, enclosure may mean full or complete enclosure or may include partially enclosed spaces as well. The cross section of an enclosure 304 may be C-shaped or may have gaps. In some embodiments, the enclosure may be perforated, or mesh, or any of a number of structures that can be used to generally define a space in which it may be important to remove heat. Alternatively, in some embodiments it may be important to input heat within the enclosure 304. In some embodiments, the enclosure 304 may be defined generally by a wall which may partially or fully enclose a space within the enclosure 304. In the illustrated embodiment, the cross section of the enclosure 304 is circular but may be any of a number of shapes. The heat transfer structure 302 may be positioned within the enclosure and transfers heat from within the enclosure to the wall of the enclosure. In some embodiments, the heat transfer structure 302 is attached to the wall of the enclosure 304. In some embodiments, the heat transfer structure 302 is integral with the enclosure 304. Various embodiments of heat transfer structures are depicted in FIGS. 4, 5, and 6. In some embodiments, a heat transfer structure may include multiple fins. In some embodiments, the fins may be attached to each other or integrally formed as one body. The attachment of fins to each other, or the attachment of the heat transfer structure to the enclosure may be done in any number of ways, including without limitation, one or more of the following: gluing, brazing, chemical or non-chemical bonding, welding, and other methods of attaching. FIG. 3 also depicts a heat source 306 used for endothermic reactions.

In some embodiments, the heat transfer structure includes fins or pads or surfaces which are made from a material or materials which are capable of collecting or absorbing heat and transferring heat. In some embodiments, the heat transfer structure may include one or more of the following materials: aluminum, steel, copper, brass, gold, silver, ductile alloys, ceramics, powdered metallurgy, and other precious or non-precious metals or ceramics, and other materials capable of transferring heat. In some embodiments, the fins extend outward from a point within the enclosure. In some embodiments, the fins extend to the wall of the enclosure. In some embodiments, the fins extend beyond the wall. In some embodiments, some fins extend to an inner surface of the enclosure and other fins may start at the outer surface of the enclosure and extend out. It will be appreciated that in some applications with fins external to the enclosure allow the temperature of the outer surface of the enclosure to more closely match the temperature of the medium or coolant outside and adjacent to the outer wall, whether the medium is liquid, gas, solid, gel, or other mediums or combination of mediums.

In some embodiments, one or more fins are attached to each other at an internal point within the enclosure. In some embodiments, the fins are not attached to each other within the enclosure. In some embodiments, the fins may or may not share a furthest interior point within the enclosure. In some embodiments, at least one of the fins is configured such that the length between an innermost point of the fin to the enclosure wall is the shortest possible length. In other words, when viewing the cross section of the heat transfer structure there is at least one fin where the heat travels the shortest distance from an interior point to the enclosure wall. For a circular cross section, the shortest length to an enclosure wall is a radial fin. For other shapes, the shortest distance is where the fin is orthogonal to the surface of the enclosure. In some embodiments, the one fin may intersect another fin or a secondary fin may branch off a main fin. In some embodiments, there are no branches or intersections along a cross section of the heat transfer structure between an innermost point of the fins and the wall of the enclosure. It will be appreciated that this configuration can be achieved even when two or more fins share the same innermost point, as in a wagon wheel configuration. In some embodiments, the fins extend at varying distances from within the enclosure. In some embodiments, the heat transfer structure may be configured to minimize the length of a heat conducting path from an innermost point of the fin to the wall of the enclosure.

In some embodiments, each FT reactor tube 202 may be a fixed bed reactor that includes a catalytic material. Catalysts may include cobalt, iron, ruthenium, nickel, rhodium, palladium, osmium, iridium, platinum, other transition metals, mixtures of these elements, alloys, and/or other suitable materials. In some embodiments, FT reactor tube 202 may include more than one catalyst, e.g., ruthenium promoted cobalt or potassium promoted iron and copper. Catalyst may be present within FT reactor tubes 202 in pellets, microfibrous substrate, and/or other suitable materials. As is known in the art, when syngas passes through FT reactor tubes 202 at certain temperatures and pressures, CO and $H_2$ may interact with the catalysts to create a variety of FT hydrocarbons and water, including, for example, straight chain alkanes and alkenes with carbon numbers ranging from C1 to C100. In certain embodiments, FT hydrocarbons in the liquid phase may be the most desired FT products because they may be the most economically valuable. Typically the reaction proceeds according to the following formula: $(2n+1)H_2+nCO \rightarrow C_nH_{(2n+2)}+nH_2O$, where n is an integer. Accordingly, as syngas is converted into FT hydrocarbons, water is produced.

In some embodiments, a heat transfer structure inert material may be mixed with the catalyst in the FT catalytic material to enhance heat transfer in the FT reactor, in particular embodiments. This inert material may be a highly conductive heat transfer material, for example, a metal or a ceramic, in particular embodiments. A reaction occurs in FT reactor tubes 202 and some or all of the entering syngas may interact with the catalyst to create FT hydrocarbons and/or other compounds. FT hydrocarbons, unconverted syngas, and water generated during the reaction exit the FT reactor tubes at the bottom of FT reactor 108. In particular embodiments, this process occurs at temperatures ranging from 200° C. to 300° C. and at pressures ranging from 150 psig to 450 psig. Further, the conversion of syngas to FT hydrocarbons is highly exothermic; the heat of reaction is approximately 165 kilojoules per mole of CO reacted. If the heat generated during the production of FT hydrocarbons is not removed as the reaction proceeds, temperatures within the FT reactor tube may rise and the resulting products may be gas phase hydrocarbons rather than more economically valuable liquid phase FT hydrocarbons.

Optimizing the conversion of syngas to FT hydrocarbons is a primary goal during operation of FT reactor 108. Controlling temperature within FT reactor 108 and, in particular, within each FT reactor tube 202, may help optimize conversion. The reaction is highly exothermic and as a result, the temperature within the FT reactor tubes 202 increases significantly. To maximize the syngas to liquid FT hydrocarbon conversion and to help prevent thermal runaway, temperature control with the FT reactor tubes 202 is desired. In FT reactors where operating temperatures are not sufficiently controlled, the temperature gradient within a FT reactor tube may vary significantly and may result in an undesired distribution of hydrocarbon products. Under particular conditions, the temperature may rise and may result in a higher than desired amount of vapor phase and low carbon number FT hydrocarbons. Generally, liquid phase FT hydrocarbons are more desirable because of their economic value. FT hydrocarbons are generally produced according to the Anderson-Shultz-Flory ("ASF") distribution which provides the probability of chain grown as a function of temperature. The ASF distribution may be expressed as $W_n=n(1-\alpha)^2\alpha^{n-1}$, where $W_n$ is the weight fraction of hydrocarbon molecules containing n carbon atoms, and $\alpha$ is the chain growth probability factor, which is catalyst and temperature dependent. The ASF chain growth probability factor, $\alpha$, decreases by approximately 0.004 per every degree (° C.) increase in catalyst temperature if other reaction conditions such as pressures and partial pressures remain the same. As a result, a 15° C. variation in temperature within a FT reactor, would result in a 0.06 shift in the $\alpha$ value. In certain embodiments, the optimal $\alpha$ value for a FT liquid hydrocarbon may be approximately 0.85. An upward shift of 0.06 would result in an a value of 0.91, which may correlate with the production of an undesirable amount of wax. A downward shift of 0.06 would result in an a value of 0.79, which may correlate with the production of an undesirable amount of gas phase products. Thus, maintaining the FT reactor tube at a particular temperature or temperature range is important to avoid vapor phase products associated with higher bed temperatures. Further, lower temperatures tend to favor production of waxes, which present transportation and usability challenges, but may be good refinery feedstock for the production of lubricants. However, the heat transfer structure 302 displaces volume otherwise filled with catalyst lowering the amount of reaction. Optimizing the heat transfer structure 302 requires transferring the heat efficiently while utilizing the least amount of volume.

Heat transfer structures 302 may provide a means to control and reduce temperature within FT reactor tubes. Heat transfer structure 302 run longitudinally from the top to the bottom of FT reactor tubes 202. In various embodiments, various portions of heat transfer structures 302 extend radially from within FT reactor tubes 202. Catalytic material and inert heat transfer media are packed within each FT reactor tube 202 around heat transfer structure 302. As syngas passes through FT reactor tubes 202 and comes into contact with the catalytic material, the FT reaction occurs and generates heat throughout FT reactor tubes 202. Heat transfer structures 302 may be constructed of a conductive metal and may be able to conduct some of the heat generated within FT reactor tubes 202 to the walls of the enclosure 304. In certain embodiments, heat transfer structure may be constructed of silver, copper, gold, aluminum, zinc, nickel, brass, bronze, iron, platinum, carbonized steel, lead, stainless steel, or any conductive metal, alloy, or other material. In various embodiments, heat transfer structures 302 may be present in some or all FT reactor tubes 202 within a FT reactor 108. Various structures, not shown, may allow for coolant from a coolant source to flow outside of the enclosure 304. In particular embodiments, the coolant may be water, Dowtherm® (a product of the Dow Chemical Company), Therminol® (a product of the Monsanto Chemical Company) or other coolant. The coolant may be both thermally stable at the reactor operating temperature, and have a vapor pressure curve such that the vapor pressure at reactor operating temperature is above the normal boiling point (at local atmospheric pressure) and below the reactor maximum allowable working pressure (MAWP). In various embodiments, a secondary cooling system may also be utilized.

By using heat transfer structures 302 to transfer heat from within FT reactor tubes 202 to the exterior surface of the FT reactor tubes 202, the temperature within the FT reactor tube 202 may be better controlled and less variable. This may promote a more uniform and/or more targeted production of FT hydrocarbons and may allow for the production of more desired or more valuable hydrocarbons. Technical advantages of using heat transfer structure 302 may include improved temperature control. Advantages may also include reductions in temperature gradients and/or the overall temperature within FT reactor tubes. This ability to improve control and/or reduce the temperature may allow for FT reactor tubes with an increased diameter. In conventional FT reactors, FT reactor tubes may measure approximately ⅝ inch in diameter, and most often are no more than 1 inch. In FT reactor tubes with heat transfer structures, diameters may be expanded to 2 inches, 3 inches, 4 inches, 5 inches, 6 inches, 7 inches, or greater. Often as the number of FT reactor tubes within a FT reactor increases, the cost increases. For example, increasing the number of FT reactor tubes may necessitate the addition of a pressure dome over the feed manifold. Therefore, expanding the diameter of the tubes may allow for an increase in production without the increase in costs often associated with a higher number of FT reactor tubes, including, for example, manufacturing, operational, and maintenance costs. Heat transfer structure 302, as described above, may be used during the production of FT hydrocarbons. Additionally or alternatively, heat transfer structure 302 may be used in other production process to achieve a processes enhancement. For example, heat transfer structure 302 could be used for endothermic processes such as steam methane reforming (SMR) and catalytic methane reforming.

Heating element 306 may be a heating band or any device suitable to heat the exterior of reactor tube 202, such as by way of non-limiting example, non-electric heaters, radiant heaters, convective heaters, and the like. Certain embodiments may employ more than one heating element 306. For example, there may be multiple heating bands positioned around reactor tube 202 along the length of the enclosure. As the FT reaction is exothermic, heating element 306 may not be present in an FT reactor, in particular embodiments. Heating element 306 may be used for endothermic reactions where heat addition is needed, such as SMR and catalytic methane reforming. Heating element 306 may be coupled to a control unit, which may control heating element 306. The control unit may also be coupled to a feedback device, such as a thermocouple within reactor tube 202, which may allow the control unit to more efficiently monitor and/or modify the temperature within a fixed bed reactor via heating element 306. In various embodiments, heating element 306 may be used to enhance sulfur reduction by providing heat to heat transfer element 302 for conduction into reactor tube 202. Heat transfer structure 302 may also be used to enhance other reactions, such as SMR and catalytic methane reforming in a way similar to that described with regard to the removal of sulfur above. In the case of SMR and catalytic methane reforming, heat transfer structure 302 may be loaded with a nickel catalyst, in particular embodiments. In various embodiments, heating element 302 may be activated to generate heat sufficient to increase the interior temperature of a fixed bed reactor to at or near approximately 300° C. (although any appropriate temperature may be used). For example, in a methane reforming reaction temperatures could be as high as 900° C.

Heat transfer structure 302 may be removed from reactor tube 202 and/or replaced. In particular embodiments, a particular heat transfer structure 302 may be used in a reactor tube for the treatment of a feed stream and may subsequently be used in a reactor tube in a FT reactor, or vice versa. In some embodiments, heat transfer structure 302 may be integral with the enclosure 304.

FIG. 4 depicts a cross section of one embodiment of a heat transfer structure 400 with radial components or fins 402-406 extending within the FT reactor tube. In the depicted embodiment, the fins 402-406 are integral with the enclosure 408. Additionally, the depicted embodiment illustrates external fins 410 external to the enclosure 408. In some embodiments, the fins 402-406 include a first end in contact with an inner surface of the enclosure 408 and a second end within the enclosure. In the depicted embodiment, the enclosure 408 is circular and the fins 402-406 extend radially in a direction orthogonal to the surface of the enclosure 408. In some embodiments, the enclosure 408 may include any number of shapes or combinations thereof. In such embodiments, the fins 402-406 may follow a path including the shortest possible length between the two ends of the fins 402-406. As depicted, fins 402, 404, and 406 may extend varying distances within the enclosure 408. In certain embodiments, there may be more or less primary or secondary fins 402-406. In various embodiments, the number of primary and/or secondary fins may depend on the diameter of the integral FT reactor tube. External fins 410 extend outward from the enclosure 408. In some embodiments, the external fins 410 may be integral with enclosure 408. In some embodiments, external fins 410 may be separate from the enclosure 408. The external fins 410 may come in contact with coolant and aid in heat removal. The number of external fins 410 may correspond to the number of fins 402-406 within the enclosure and/or may line up with the fins 402-406. In some embodiments, there are more external fins 410 than fins 402-406. In some embodiments, there are less external fins 410 than fins 402-406.

In some embodiments, the fins 402-406 have varying cross section widths. In other words, the cross section width at a first end (the base or enclosure contacting end) may be larger or smaller than the cross section width of a second end (the tip within the enclosure). The fins may taper in either or both directions. Varying cross sections and widths are important for transferring heat to outside the enclosure 408. As heat travels down the fins 402-406 to outside the enclosure the heat flux may increase thereby calling for increased cross section at the base of the fins 402-406. However, counter to this, the cross section at the tip of the fins may be greater that the cross section at the base of the fins increasing the surface area of the tips within the enclosure. While uniform temperature may be desired, the temperature in the center will typically be greatest and will reduce as one travels closer to the walls of the enclosure.

FIG. 5 depicts a cross section of another embodiment of a heat transfer structure 500 with parabolic components. Heat transfer structure 500 is configured to fit within an FT reactor tube 202. Heat transfer structure 500 includes fins 502, parabolic fins 504, feet 506, and center portion 508.

As illustrated, six fins 502 extend from center portion 508 in a radial direction. Because heat transfer structure 500 is configured to fit within a FT reactor tube 202, fins 502 that extend from center portion 508 extend toward the interior wall of the enclosure of an FT reactor tube. It should be noted that while a particular number of fins are show, any appropriate number may be used. Two parabolic fins 504 may extend radially from each fin 502 toward the interior wall of the FT reactor tube in which the heat transfer structure is inserted. The parabolic fins 504 may have a parabolic, linear branched, elliptical, hyperbolic and other suitable shapes, in particular embodiments. Because two parabolic fins 504 extend radially from opposite sides of fins 502 and extend from approximately the same point along fins 502, the two parabolic fins 504 may together form a parabolic shape. An advantage of this design may include increasing the number of projections extending radially within a FT reactor tube toward its interior wall, without excessively crowding the center of the reactor. In addition, this configuration may be relatively easy to manufacture. In various embodiments, only one parabolic fin 504 may extend from each fin 502. In certain embodiments, parabolic fins 504 may extend from each fin at any point along the fin 502 and multiple fins may extend from fins 502 at different points. In particular embodiments, more than two parabolic fins 504 may extend from each fin 502. For example, two parabolic shapes or four parabolic fins 504 may exist about one radial fin 502. In certain embodiments, certain fins 502 may include one or more parabolic fins 504 while other fins 502 do not include any parabolic fins 504.

In some embodiments, each fin 502 and parabolic fin 504 includes a foot 506. Each foot 506 is generally perpendicular to its fin or parabolic fin and contacts or abuts the interior wall of the enclosure (not shown) of a fixed bed reactor. Feet 506 increase the contact area between heat transfer structure 500 and the inner surface of the enclosure of a fixed bed reactor, which may increase the efficiency of heat conduction. Heat transfer structure 500 may be sized to be inserted in a FT reactor tube (or other fixed bed reactor). In certain embodiments, the opening in center 508 may accommodate a thermocouple, which may be used to measure the temperature at various locations along the length of heat transfer structure 500.

In various embodiments, the dimensions of fins 502, parabolic fins 504, feet 506, and center 508 may be of any appropriate dimension. In various embodiments, feet 506 may be of varying size. Once heat transfer structure 500 is placed within a FT reactor tube (or other fixed bed reactor), catalytic material may be packed in around it.

FIG. 6 depicts a cross section of another embodiment of a heat transfer structure 600. Heat transfer structure 600 includes primary fins 602, secondary radial fins 604, extrusions 606, center 608, tertiary fins 610, and an enclosure 612.

Unlike heat transfer structure 500, which may be fabricated and then inserted into a FT reactor tube, the heat conductive portions of heat transfer structure 600 may be coterminous or integral with the enclosure 612 of a fixed bed reactor. Six radial fins 602 extend from center portion 608 in a radial direction to the interior wall of the enclosure 612. Twelve secondary radial fins 604 extend from within the reactor tube. Two secondary radial fins 604 extend in the chamber created by adjacent primary radial fins 602. This design may be advantageous because it increases the number of fins extending radially within a FT reactor tube to its interior wall without excessively crowding the center of the reactor. In certain embodiments, there may be more or less primary or secondary radial fins 602. In various embodiments, the number of primary and/or secondary radial fins may depend on the diameter of the integral FT reactor tube. As illustrated each primary radial fin 602 and each secondary radial fin 604 have a corresponding external fin or extrusion 606 that extends past the exterior of the enclosure 612. Tertiary fins 610 extend from primary radial fins 602 and extend generally perpendicularly into cavities within fixed bed reactor. In various embodiments, the number of tertiary fins 610 may be increased or decreased. In particular embodiments, tertiary fins 610 may also extend generally perpendicularly from one or more secondary radial fins 604. In certain embodiments, center 608 may accommodate a thermocouple, which may be used to measure the temperature at various locations along the length of heat transfer structure 500. The opening in center 608 may be used to position the thermocouple. Heat transfer structure 700 may have similar or different dimensions to those of heat transfer structures 400 and 500.

The heat transfer structures illustrated in FIGS. 4-6, may enable the use of tubes of increased diameter versus what would be possible without the heat transfer structures, by allowing for increased heat transfer into, or out of, the reactor tubes. By allowing for an increased tube diameter, the heat transfer structures allow fewer tubes to be used in a reactor for a given flow rate. Having fewer tubes reduces the capital expense of a reactor, as well as the operational expenditure as fewer tubes need to be replaced when a catalyst change is needed.

Figure 7:
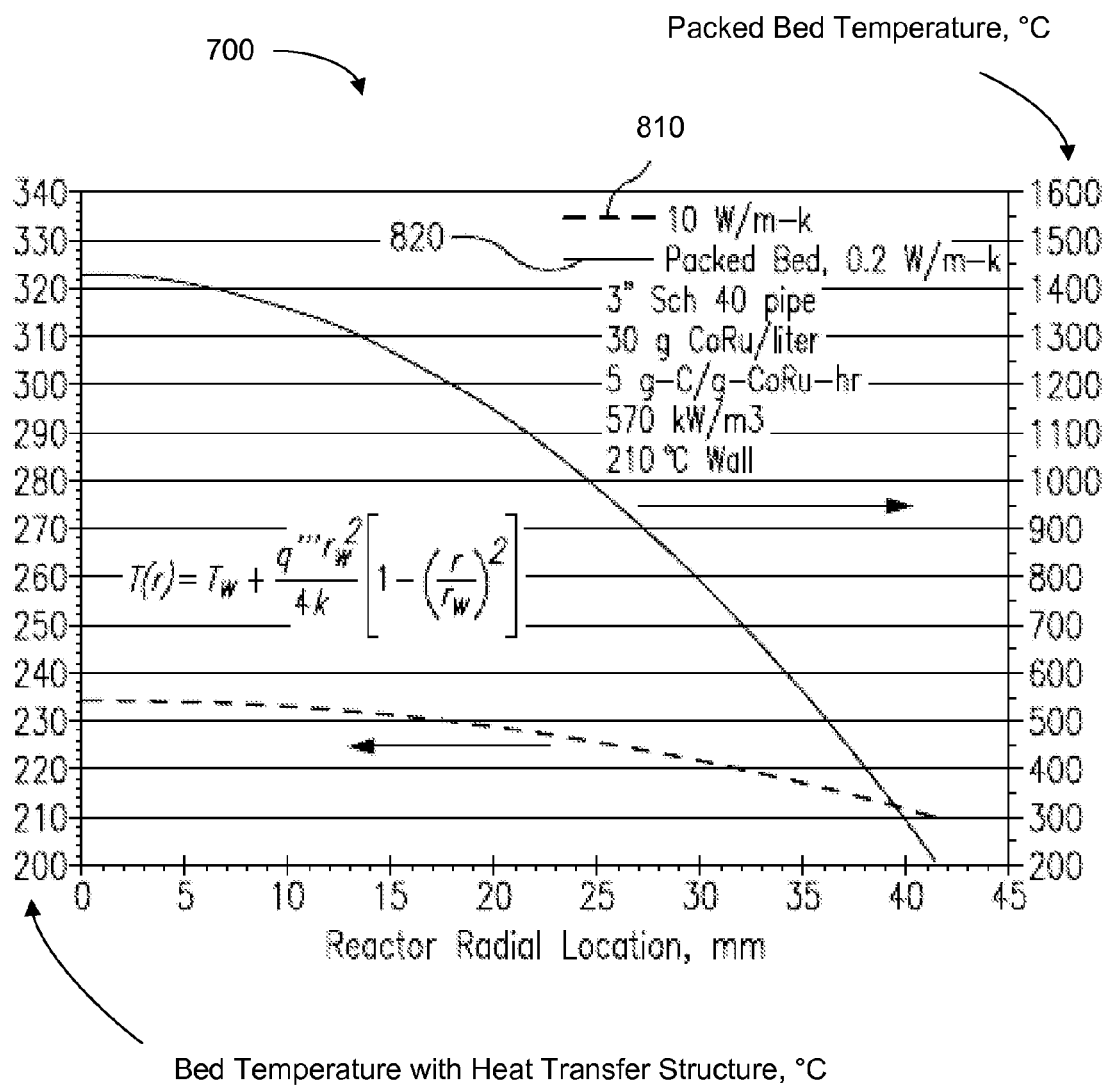
FIG. 7 depicts a temperature profile map for an example heat transfer structure.

FIG. 7 illustrates a radial temperature profile of an example heat transfer structure. Graph 700 plots the location along the reactor radius in millimeters versus bed temperature. Data points 710 include data modeling the temperature of a packed bed reactor that includes a heat transfer structure similar to heat transfer structure 500 discussed in conjunction with FIG. 5. Data points 720 include data modeling the temperature of a packed bed reactor that does not include a heat transfer structure. The baseline parameters for both data sets were the same: assume a 3 inch, schedule 40 pipe with 30 grams of cobalt-ruthenium catalyst per liter, 5 grams of carbon per gram of cobalt-ruthenium per hour, 570 kW per cubic meter, and a reactor tube wall temperature of 210° C. Using a heat transfer structure provides a marked reduction in temperature, especially as reactor radial location decreases. This flattening of the temperature profile for a FT reactor tube that includes a heat transfer structure demonstrates the ability to control temperatures within a FT reactor. Controlling and/or maintaining temperatures may allow for the increased production of high value FT hydrocarbons, such as liquid, straight chain alkenes and alkenes.

Figure 8:
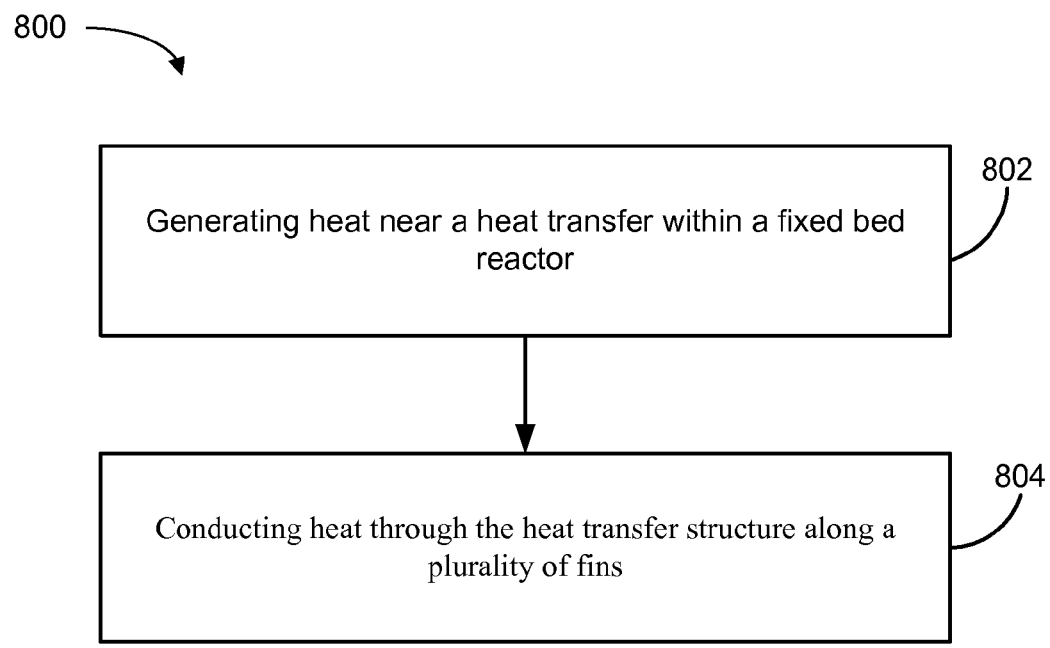
FIG. 8 depicts one embodiment of a method of conducting heat in a fixed bed reactor.

FIG. 8 depicts one embodiment of a method of conducting heat in a fixed bed reactor. Although, the method is described in conjunction with the Figs. above, the method may be accomplished via alternative embodiments. At block 802, heat is generated near a heat transfer structure 302 within a fixed bed reactor. In some embodiments, heat is generated within an enclosure 304 of a fixed bed reactor. In some embodiments, heat is generated outside the enclosure 304 of a fixed bed reactor. At block 804, heat is conducted through the heat transfer structure along a plurality of fins. In some embodiments, heat is conducted from the space within the enclosure 304 to outside the enclosure 304. In some embodiments, heat is conducted from outside the enclosure 304 to the space within the enclosure 304. The heat transfer structure may be consistent with the embodiments described above. In some embodiments, the method 800 further includes conducting heat through the enclosure 304 to a coolant medium at least partially surrounding an outer surface of the enclosure of a fixed bed reactor.

In some embodiments, the temperature difference between any two points of the heat transfer structure is between 0% and 25% of an average temperature difference within the enclosure 304 of the fixed bed reactor. In some embodiments, the temperature difference between any two points of the heat transfer structure is between 0 percent and 25 percent of a target reaction temperature within the enclosure of the fixed bed reactor. In various embodiments, method 800 may include other or additional steps consistent with the descriptions for the Figs. above.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
    a heat transfer structure configured to be disposed at least partially within an enclosure of a fixed bed reactor and operable to transfer heat from a heat source to a heat sink, the heat transfer structure comprising:
    a plurality of fins each comprising a first end and a second end, the first end contacting an inner surface of the enclosure of the fixed bed reactor, the second end at least partially enclosed within the enclosure of the fixed bed reactor, wherein a path of at least one of the plurality of fins comprises the shortest possible length between the first end of the at least one of the plurality of fins and the second end of the at least one of the plurality of fins.

2. The apparatus of claim 1, wherein a cross section width of the second end of a first fin of the plurality of fins is greater than the cross section width of the first end of the first fin.

3. The apparatus of claim 1, wherein a cross section width of the second end of a first fin of the plurality of fins is less than the cross section width of the first end of the first fin.

4. The apparatus of claim 1, wherein the heat transfer structure is integral with the enclosure of the fixed bed reactor, wherein the first end of each of the plurality of fins is integral with the enclosure of the fixed bed reactor.

5. The apparatus of claim 4, the heat transfer structure further comprising a second plurality of fins, wherein the second plurality of fins are external to the enclosure of the fixed bed reactor, wherein each of the second plurality of fins comprise a third end and a fourth end, the third end contacting an outer surface of the enclosure of the fixed bed reactor.

6. The apparatus of claim 1, wherein the plurality of fins do not contact each other within the enclosure of the fixed bed reactor.

7. The apparatus of claim 1, wherein the heat transfer structure further comprises a first center axis that is approximately in the same location as a second center axis of the enclosure of the fixed bed reactor.

8. The apparatus of claim 1, wherein two or more fins attach at an internal point within the enclosure of the fixed bed reactor.

9. The apparatus of claim 8, wherein the two or more fins that attach at an internal point within the enclosure of the fixed bed reactor form a generally parabolic shape.

10. The apparatus of claim 8, wherein a path of each of the two or more fins that attach at an internal point within the enclosure of the fixed bed reactor comprises the shortest possible length between the first end and the second end of the two or more fins.

11. The apparatus of claim 1, wherein the enclosure of the fixed bed reactor comprises a tube, wherein a diameter of the enclosure is greater than 1 inch.

12. A method for conducting heat through a heat transfer structure of a fixed bed reactor, the method comprising:
    generating heat in a cavity near the heat transfer structure; and
    conducting heat through the heat transfer structure wherein the heat transfer structure comprises a plurality of fins each comprising a first end and a second end, the first end contacting an inner surface of the enclosure of the fixed bed reactor, the second end at least partially enclosed within the enclosure of the fixed bed reactor, wherein a path of at least one of the plurality of fins comprises the shortest possible length between the first end of the at least one of the plurality of fins and the second end of the at least one of the plurality of fins.

13. The method of claim 12, the method further comprising:
    generating heat within the enclosure of the fixed bed reactor; and
    conducting the heat from within the enclosure of the fixed bed reactor through the heat transfer structure to the enclosure of the fixed bed reactor, wherein the heat transfers from the second end to the first end of each of the plurality of fins.

14. The method of claim 13, the method further comprising conducting the heat through the enclosure to a coolant medium at least partially surrounding an outer surface of the enclosure of the fixed bed reactor.

15. The method of claim 12, the method further comprising:
    generating heat outside the enclosure of the fixed bed reactor; and
    conducting the heat from outside the enclosure of the fixed bed reactor through the heat transfer structure to space within the enclosure of the fixed bed reactor, wherein the heat transfers from the first end to the second end of each of the plurality of fins.

16. The method of claim 12, wherein the temperature difference between any two points of the heat transfer structure is between 0 percent and 25 percent of an average temperature within the enclosure of the fixed bed reactor.

17. The method of claim 12, wherein the temperature difference between any two points of the heat transfer structure is between 0 percent and 25 percent of a target reaction temperature within the enclosure of the fixed bed reactor.

18. A system comprising:
a fixed bed reactor enclosing a catalytic material and configured to receive a feed stream, the feed stream reacting with the catalytic material;
a heat transfer structure configured to be disposed at least partially within an enclosure of the fixed bed reactor and operable to transfer heat from a heat source to a heat sink, the heat transfer structure comprising:
a plurality of fins each comprising a first end and a second end, the first end contacting an inner surface of the enclosure of the fixed bed reactor, the second end at least partially enclosed within the enclosure of the fixed bed reactor, wherein a path of at least one of the plurality of fins comprises the shortest possible length between the first end of the at least one of the plurality of fins and the second end of the at least one of the plurality of fins.

19. The system of claim 18, wherein the system further comprises a cooling structure at least partially surrounding the enclosure of the fixed bed reactor configured to cause heat to conduct away from the catalytic material through the heat transfer structure to outside the enclosure of the fixed bed reactor.

20. The system of claim 18, wherein the system further comprises a heating element at least partially surrounding the enclosure of the fixed bed reactor configured to cause heat to conduct through the heat transfer structure to the catalytic material within the enclosure of the fixed bed reactor.

21. The system of claim 18, wherein the enclosure of the fixed bed reactor comprises a tube, wherein a diameter of the enclosure is greater than 1 inch.

* * * * *